(12) United States Patent
Kimura et al.

(10) Patent No.: US 10,947,611 B2
(45) Date of Patent: Mar. 16, 2021

(54) COMPOSITE ROLL FOR ROLLING

(71) Applicant: KUBOTA CORPORATION, Osaka (JP)

(72) Inventors: Hiroyuki Kimura, Amagasaki (JP); Yutaka Tsujimoto, Amagasaki (JP); Shuhei Yamamoto, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 171 days.

(21) Appl. No.: 16/466,398

(22) PCT Filed: Dec. 26, 2017

(86) PCT No.: PCT/JP2017/046720
§ 371 (c)(1),
(2) Date: Jun. 4, 2019

(87) PCT Pub. No.: WO2018/124101
PCT Pub. Date: Jul. 5, 2018

(65) Prior Publication Data
US 2019/0352753 A1  Nov. 21, 2019

(30) Foreign Application Priority Data

Dec. 28, 2016 (JP) .............................. JP2016-254908

(51) Int. Cl.
*C22C 38/56* (2006.01)
*B21B 27/02* (2006.01)
(Continued)

(52) U.S. Cl.
CPC .............. *C22C 38/56* (2013.01); *B21B 27/02* (2013.01); *B22D 19/16* (2013.01); *C22C 38/02* (2013.01);
(Continued)

(58) Field of Classification Search
CPC ........ B21B 27/02; B22D 19/16; B22D 13/02; C22C 38/56; C22C 38/16; C22C 38/02;
(Continued)

(56) References Cited

U.S. PATENT DOCUMENTS 5,674,171 A * 10/1997 Ichino ..................... B21B 27/00
  492/3
9,044,807 B2 * 6/2015 Oda ....................... B22D 13/023
(Continued)

FOREIGN PATENT DOCUMENTS

EP  2 706 128 A1  3/2014
EP  2 770 073 A1  8/2014
(Continued)

OTHER PUBLICATIONS

Japanese Patent Office, "International Search Report" (with English language translation), from corresponding International Application No. PCT/JP2017/046720, dated Jul. 5, 2018, 2 pp.
(Continued)

*Primary Examiner* — Jason L Vaughan
(74) *Attorney, Agent, or Firm* — Eckert Seamans Cherin & Mellott, LLC

(57) ABSTRACT

The present invention provides a composite roll for rolling including an outer layer having excellent wear resistance, surface roughening resistance, crack resistance, and accident resistance due to segregation of MC carbides being suppressed to adjust the amount of graphite to be crystallized. The composite roll for rolling of the present invention is a composite roll for rolling that has an outer layer and is produced through centrifugal casting, and the outer layer contains C in an amount of 2.2 mass % to 3.2 mass %, Si in an amount of 1.0 mass % to 3.0 mass %, Mn in an amount of 0.3 mass % to 2.0 mass %, Ni in an amount of 3.0 mass % to 7.0 mass %, Cr in an amount of 0.5 mass % to 2.5 mass
(Continued)

%, Mo in an amount of 1.0 mass % to 3.0 mass %, V in an amount of 2.5 mass % to 5.0 mass %, Nb in an amount of more than 0 mass % and 0.5 mass % or less, and a remaining portion including Fe and inevitable impurities, and a condition (a): Nb mass %/V mass %<0.1, and a condition (b): 2.1×C mass %+1.2×Si mass %−Cr mass %+0.5×Mo mass %+(V mass %+Nb mass %/2)≤13.0 mass % are satisfied.

18 Claims, 4 Drawing Sheets

(51) Int. Cl.
   B22D 19/16 (2006.01)
   C22C 38/02 (2006.01)
   C22C 38/04 (2006.01)
   C22C 38/44 (2006.01)
   C22C 38/46 (2006.01)
   C22C 38/48 (2006.01)
   C22C 38/54 (2006.01)
   C22C 38/34 (2006.01)
   C22C 38/58 (2006.01)
   B22D 13/02 (2006.01)

(52) U.S. Cl.
   CPC .............. *C22C 38/04* (2013.01); *C22C 38/34* (2013.01); *C22C 38/44* (2013.01); *C22C 38/46* (2013.01); *C22C 38/48* (2013.01); *C22C 38/54* (2013.01); *C22C 38/58* (2013.01); *B22D 13/02* (2013.01)

(58) Field of Classification Search
   CPC ......... C22C 38/04; C22C 38/34; C22C 38/44; C22C 38/46; C22C 38/48; C22C 38/54; C22C 38/58
   See application file for complete search history.

(56) References Cited

U.S. PATENT DOCUMENTS

| | | | | |
|---|---|---|---|---|
| 9,221,232 | B2 * | 12/2015 | Oda | B21B 27/00 |
| 9,358,758 | B2 * | 6/2016 | Oda | C22C 37/10 |
| 9,573,176 | B2 * | 2/2017 | Ichino | B21B 27/032 |
| 9,724,740 | B2 * | 8/2017 | Oda | C22C 38/02 |
| 9,815,098 | B2 * | 11/2017 | Hattori | B22D 19/16 |
| 10,376,937 | B2 * | 8/2019 | Tsujimoto | C22C 38/56 |
| 2004/0214030 | A1 | 10/2004 | Windhager et al. | |
| 2014/0248511 | A1 | 9/2014 | Oda et al. | |
| 2015/0336353 | A1 | 11/2015 | Oda et al. | |
| 2019/0366402 | A1 * | 12/2019 | Nozaki | B22D 19/16 |
| 2020/0298294 | A1 * | 9/2020 | Nozaki | C22C 38/56 |

FOREIGN PATENT DOCUMENTS

| | | |
|---|---|---|
| JP | SHO63-224859 A | 9/1988 |
| JP | HEI 05/311335 A | 11/1993 |
| JP | HEI 06-256889 A | 9/1994 |
| JP | 2004-68142 A | 3/2004 |
| JP | 2004-82209 A | 3/2004 |
| JP | 2006-152381 A | 6/2006 |
| JP | 2009-221573 A | 10/2009 |
| JP | 2015 080813 A | 4/2015 |
| WO | 2013/077377 A1 | 5/2013 |
| WO | 2014/178437 A1 | 11/2014 |

OTHER PUBLICATIONS

Japanese Patent Office, "Office Action" for Japanese Patent Application No. 2018-054431, dated Aug. 25, 2020, 3 pp.
American Foundrymen's Society, Inc., "Ductile Iron Handbook", ISBN 0-87433-124-2, Copyright 1992, Revised 1993, pp. 73, 76, 97 and 109.
Yodogawa Steel Works, Ltd, "Working Roll for Iron and Steel", (http://www.yodoko.co.jp/product/roll/steel.html), includes English language translation, 2009, 9 pp.
Takashi Noda, "Current Foundry Pig Iron and Impurities of Steel Scrap, Effect of High Purity Pig Iron on Casting Property", Japan Foundry Society; vol. 79 (2007) No. 8. pp. 430-434 (no English language translation available).
"Utilization of Iron Scraps" reported by Tokyo Seitetsu Kabushiki Kaisha in Mar. 2013, 34 pp., (includes partial English translation on pp. 9-19).
"Development of Technology for Removal and Detoxification of Impurities in Molten Cast Iron", Japan Foundry Association, in Nov. 2009, 30 pp. (no English language translation available).
"Neutralization or Elimination Treatment of Boron from Molten Cast Iron", Japan Foundry Society; vol. 79 No. 8. pp. 459-464, (no English language translation available).
European Patent Office, "extended European search report", dated Jul. 1, 2020, 8 pp.

* cited by examiner

Inventive Example 4 (outer circumferential side)

Inventive Example 9 (outer circumferential side)

Comparative Example 4 (outer circumferential side)

Comparative Example 4 (inner circumferential side)

COMPOSITE ROLL FOR ROLLING

TECHNICAL FIELD

The present invention relates to a composite roll for rolling that is used in a hot strip mill in a hot rolling process.

BACKGROUND ART

A composite roll for rolling is used in a hot strip mill for hot rolling. An outer layer of the composite roll, which comes into contact with a hot strip, needs to have excellent wear resistance, surface roughening resistance, crack resistance, and accident resistance. Thus, a high-speed steel cast iron material or a high alloy grain cast iron material is used in the outer layer material.

For example, Patent Document 1 proposes a high-speed cast iron material having a chemical composition containing C in an amount of 1.8 wt % to 3.6 wt %, Si in an amount of 1.0 wt % to 3.5 wt %, Mn in an amount of 0.1 wt % to 2.0 wt %, Ni in an amount of 0.5 wt % to 10.0 wt %, Cr in an amount of 2.0 wt % to 10 wt %, Mo in an amount of 0.1 wt % to 10 wt %, W in an amount of 0.1 wt % to 10 wt %, V and Nb in an amount of 1.5 wt % to 10 wt % in total of one or two thereof, and a remaining portion that substantially is Fe.

A crack resulting from a rolling reduction accident appears due to a roll outer layer and a rolled material seizing and the outer layer being subjected to thermal shock. It is thought that graphite in a metal structure can prevent this crack from growing. Thus, in a hot strip mill, a high alloy grain cast iron material in which graphite is crystallized in the metal structure and that has excellent seizure resistance is used in a finishing later stand on which a chew up accident is likely to occur, and a high-speed cast iron material in which MC carbides are formed and that has excellent wear resistance is not normally used.

CITATION LIST

Patent Document

[Patent Document 1] JP H06-256889A

SUMMARY OF INVENTION

Technical Problem

Graphite is formed through crystallization and precipitation of carbon in an alloy in a solidification process, and Cr, Mo, W, V, and Nb are all elements that inhibit graphitization. In particular, among these elements, Cr is the strongest graphitization inhibiting element, and if Cr is added in a large amount, there is a risk that formation of graphite will be inhibited, and crack resistance will decrease.

Although V and Nb bind to carbon in an alloy to respectively form MC carbides, VC has a smaller specific gravity than a molten metal, and thus segregates to the inner side of the outer layer during centrifugal casting. These segregated MC carbides are unlikely to re-melt when an interlayer or an inner core serving as a core material is cast on the inner side of the outer layer, and thus there is a risk that a welding error will occur at a boundary with the core material. A welding error between the outer layer and the core material leads to a decrease in accident resistance.

On the other hand, NbC has a larger specific gravity than a molten metal, and thus moves to the outer side of the outer layer during centrifugal casting, and remains in a usage layer of a final product. Accordingly, surface roughness occurs in a surface of the outer layer, and a surface pattern of the outer layer will be transferred to a rolled hot strip.

Although MC carbides contribute to improving the wear resistance of the outer layer due to their high hardness, as described above, as a result of MC carbides segregating to the outer side or the inner side of the outer layer, the amount of MC carbides decreases, and a layer with reduced wear resistance is formed.

An object of the present invention is to provide a composite roll for rolling including an outer layer having excellent wear resistance, surface roughening resistance, crack resistance, and accident resistance due to suppressing of MC carbides segregation and adjusting the amount of graphite to be crystallized.

Solution to Problem

A composite roll for rolling according to the present invention is a composite roll for rolling that has an outer layer and is produced through centrifugal casting, in which the outer layer contains C in an amount of 2.2 mass % to 3.2 mass %, Si in an amount of 1.0 mass % to 3.0 mass %, Mn in an amount of 0.3 mass % to 2.0 mass %, Ni in an amount of 3.0 mass % to 7.0 mass %, Cr in an amount of 0.5 mass % to 2.5 mass %, Mo in an amount of 1.0 mass % to 3.0 mass %, V in an amount of 2.5 mass % to 5.0 mass %, Nb in an amount of more than 0 mass % and 0.5 mass % or less, and a remaining portion including Fe and inevitable impurities, and Nb mass %/V mass %<0.1, and    a condition (a):

2.1×C mass %+1.2×Si mass %−Cr mass %+0.5×Mo mass %+(V mass %+Nb mass %/2)≤13.0 mass % are satisfied.    a condition (b):

Also, a composite roll for rolling according to the present invention is a composite roll for rolling that has an outer layer and is produced through centrifugal casting, in which the outer layer contains C in an amount of 2.2 mass % to 3.2 mass %, Si in an amount of 1.0 mass % to 3.0 mass %, Mn in an amount of 0.3 mass % to 2.0 mass %, Ni in an amount of 3.0 mass % to 7.0 mass %, Cr in an amount of 0.5 mass % to 2.5 mass %, Mo in an amount of 1.0 mass % to 3.0 mass %, W in an amount of more than 0 mass % and 3.0 mass % or less, V in an amount of 2.5 mass % to 5.0 mass %, Nb in an amount of more than 0 mass % and 0.5 mass % or less, and a remaining portion including Fe and inevitable impurities, and Nb mass %/V mass %<0.1, and    a condition (a):

2.1×C mass %+1.2×Si mass %−Cr mass %+0.5×(Mo mass %+W mass %/2)+(V mass %+Nb mass %/2)≤13.0 mass % are satisfied.    a condition (b'):

The outer layer may further contain B in an amount of more than 0 mass % and 0.1 mass % or less.

It is preferable that the outer layer has a graphite area ratio of 0.5% to 5.0%.

Also, it is preferable that the outer layer has an MC carbide area ratio of 4.0% to 11.0%.

Advantageous Effects of Invention

According to the present invention, segregation of MC carbides of an outer layer can be suppressed during centrifugal casting, MC carbides can be dispersed approximately evenly from the outer side to the inner side of the outer layer, and the amount of crystallized graphite can also be adjusted. Thus, wear resistance, surface roughening resistance, crack resistance, and accident resistance of a composite roll for rolling can be improved. The composite roll for rolling according to the present invention can be suitable for applications to a finishing later stand that is required to be particularly stable in operation in a hot strip mill.

DESCRIPTION OF EMBODIMENTS

Figure 1:
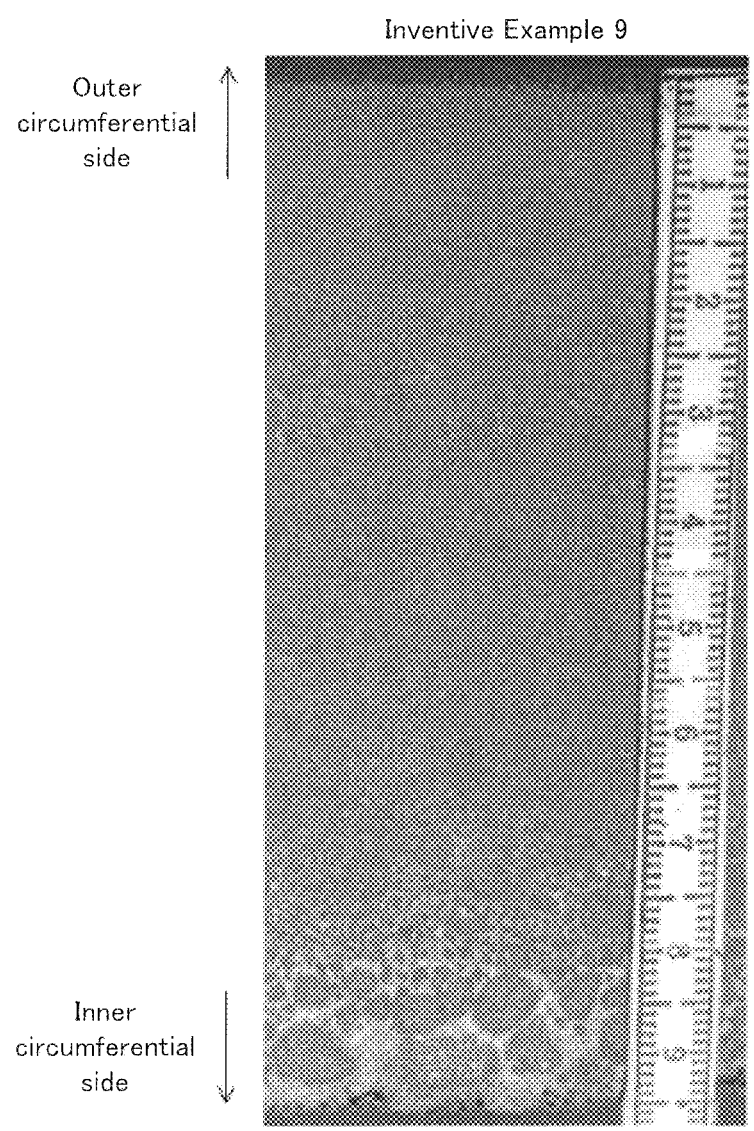
FIG. 1 is a photograph of a macrostructure of a cross section of a test material of Inventive Example 9 in the longitudinal direction.

A composite roll for rolling of the present invention may include an outer layer that is used for rolling, and a core material constituted by an interlayer and an inner core, or an inner core that is located on the inner side of the outer layer. Examples of an inner core material for constituting the inner core include high strength materials such as high grade cast iron, ductile cast iron, and graphitic steel, and an example of the interlayer material for constituting the interlayer is an adamite material.

The outer layer can be manufactured through centrifugal casting, for example. Centrifugal casting may be of a vertical-type (a rotation axis is oriented in a vertical direction), an inclined-type (a rotation axis is oriented in an oblique direction), or a horizontal-type (a rotation axis is oriented in a horizontal direction). It is preferable that the GNo. of a mold rotational speed in centrifugal casting is 100 G or more. Of course, although the outer layer can also be manufactured through static casting or the like, centrifugal casting is preferable for reducing the manufacturing cost.

Reasons for limiting components of the outer layer of the present invention are as follows.

Reasons for Limiting Components

The reason for limiting components of an outer layer material for a composite roll for rolling of the present invention will be described. Note that hereinafter, unless otherwise specified, "%" indicates mass %.

C: 2.2 Mass % to 3.2 Mass %

C can crystallize graphite and improve wear resistance and crack resistance, and crystallize into high hardness MC carbides to increase hardness. In order to improve accident resistance by reducing the amount of graphite that is to be crystallized and cementite that is an eutectic carbide to suppress excessive crystallization of MC carbides as will be described later, the content of C is set to 3.2 mass % or less. On the other hand, in order to ensure the amount of crystallized graphite, the content of C is set to 2.2 mass % or more. Preferably, the content of C is 2.3 mass % to 3.0 mass %.

Si: 1.0 Mass % to 3.0 Mass %

Si is an element necessary as an agent for deoxidizing a molten metal. In particular, Si is required to also ensure fluidity in centrifugal casting. Also, in the case of a high alloy grain cast iron material, Si is required as an element for facilitating crystallization of graphite (partial precipitation of graphite). Thus, the outer layer material contains Si in an amount of 1.0 mass % or more. However, if the content of Si exceeds 3.0 mass %, mechanical properties deteriorate, which results in a decrease in crack resistance, and thus the upper limit is set to 3.0 mass %. Preferably, the content of Si is 1.5 mass % to 2.5 mass %.

Mn: 0.3 Mass % to 2.0 Mass %

Mn as an agent for desulfurizing or deoxidizing a molten metal is an element necessary for improving the integrity of a molten metal and strengthening a matrix structure. Thus, the outer layer material contains Mn in an amount of 0.3 mass % or more. However, if the content of Mn exceeds 2.0 mass %, mechanical properties deteriorate and crack resistance decreases, and thus the content of Mn is set to 2.0 mass % or less.

Ni: 3.0 Mass % to 7.0 Mass %

Ni is an element that, as an auxiliary element for crystallization of graphite, improves the quenching properties of a matrix and facilitates the formation of bainite, and is effective in achieving strengthening of a matrix. If the content of Ni is less than 3.0 mass %, such effects are not sufficiently obtained, high hardness cannot be achieved, and wear resistance is insufficient. Thus, the lower limit of Ni is set to 3.0 mass %. On the other hand, if the content of Ni exceeds 0.7 mass %, the amount of remaining austenite increases, the remaining austenite decomposes during hot rolling, and surface roughening resistance decreases. Thus, the upper limit of Ni is set to 7.0 mass %. Preferably, the content of Ni is 4.0 mass % to 6.0 mass %.

Cr: 0.5 Mass % to 2.5 Mass %

Cr mainly binds to C and is dissolved in crystallized cementite to form a solid solution, and contributes to improving wear resistance. Also, a portion of the Cr forms precipitated carbides, and strengthens a matrix, Thus, the outer layer material contains Cr in an amount of 0.5 mass %. Note that Cr is also included in MC carbides, and has an effect of decreasing a crystallization temperature. As a result of the temperature at which MC carbides are crystallized decreasing, crystallization of MC carbides can be delayed, and the viscosity of a molten metal is increased due to the temperature of the molten metal decreasing at the time of crystallization of MC carbides, and thus movement of MC carbides in the molten metal is suppressed. In this respect, Cr has an effect of suppressing segregation of MC carbides. On the other hand, Cr is a very strong graphitization inhibiting element, and thus crystallization and precipitation of graphite are inhibited, the friction coefficient increases, and seizure resistance decreases. Accordingly, passage of a material to be rolled is impaired and the material to be rolled seizes to and embrittles the surface of the roll, resulting in a decrease in crack resistance. Thus, the upper limit of Cr is set to 2.5 mass % such that graphite can be crystallized even if the outer layer material contains V, which is a graphitization inhibiting element similarly to Cr, in a predetermined amount (V: 2.5 mass % to 5.0 mass %). Preferably, the content of Cr is 0.8 mass % to 1.5 mass %.

Mo: 1.0 Mass % to 3.0 Mass %

Mo mainly binds to C and is dissolved in crystallized cementite to form a solid solution, and contributes to improving wear resistance. Also, a portion of the Mo forms precipitated carbides, and strengthens a matrix, and thus the outer layer material contains Mo in an amount of 1.0 mass % or more. However, if the content of Mo exceeds 3.0 mass %, crystallization and precipitation of graphite are inhibited, resulting in a decrease in seizure resistance and crack resistance, similarly to the above description. Thus, the upper limit of Mo is set to 3.0 mass % or less. Preferably, the content of Mo is 1.2 mass % to 2.5 mass %.

V: 2.5 Mass % to 5.0 Mass %

V has an effect of strengthening a matrix due to being dissolved in the matrix to form a solid solution, and mainly binds to C, forms high-hardness MC carbides, and improves wear resistance of the outer layer. Thus, V is added in an amount of 2.5 mass % or more. On the other hand, if the amount of added V is too high, MC carbides containing, as the main component, V with a smaller specific gravity than a molten metal are formed, these MC carbides segregate to the inner surface side of the outer layer during centrifugal casting, and the boundary bonding soundness between an inner core and an interlayer that are provided inside the outer layer becomes worse, and thus the upper limit of V is set to 5.0 mass %. Preferably, the content of V is 3.0 mass % to 4.0 mass %.

Nb: More than 0 Mass % and 0.5 Mass % or Less

Nb is an element that binds to C and crystallizes into MC carbides with extremely high hardness, and thus Nb is added in an amount of more than 0 mass %. On the other hand, MC carbides containing Nb as the main component have a larger specific gravity than a molten metal, and thus if an outer layer is produced through centrifugal casting, the MC carbides segregate to the outer side. Thus, as will be described later, in the present invention, the content of Nb is limited to Nb mass %/V mass %<0.1 holding true, and thus the upper limit of Nb is set to 0.5 mass %, which is 1/10 of V or less. Preferably, the content of Nb is 0.002 mass % to 0.3 mass %.

Remaining Portion Including Fe and Inevitable Impurities

In this outer layer material, the remaining portion is substantially Fe, and the outer layer material can contain impurities that are inevitably mixed during melting, as long as properties of a cast iron material are not affected. Note that P and S reduce the toughness of the material, and thus the content of P and S is preferably as small as possible, and it is more preferable to reduce the content of P and the content of S to 0.2 mass % or less.

The above-described components of the outer layer satisfy the following conditions as well as the individual component ranges.

Nb Mass %/V Mass %<0.1                                    Condition (a)

This condition is a condition for reducing the amount of MC carbides that contain, as the main component, Nb whose crystallization temperature is higher than that of a molten metal and is likely to be crystallized as primary crystals, V and Nb forming MC carbides for increasing wear resistance. MC carbides containing Nb, which is crystallized as primary crystals, as the main component are in a state in which MC carbides tend to move in a molten metal that has not solidified yet, and have a larger specific gravity than the molten metal, and thus are likely to undergo segregation in centrifugal casting. In particular, in order to crystallize graphite required for crack resistance in this outer layer material that contains a large amount of carbide forming elements, as the content of Cr, Mo, and V that are carbide forming elements increases, the outer layer material needs to contain a large amount of C. However, when the outer layer is formed through centrifugal casting, if the amount of C is high, a large amount of MC carbides whose specific gravity is different from that of the molten metal are crystallized, resulting in segregation. In view of this, with the present invention, as a result of making the amount of Cr low as described above and limiting the condition (a) Nb mass %/V mass % to be less than 0.1, MC carbides containing Nb as the main component are kept from being crystallized as primary crystals, and as a result of dissolving Nb in MC carbides containing V as the main component and forming a solid solution, the specific gravity of MC carbides containing V as the main component whose specific gravity is smaller than that of a molten metal can be brought closer to the specific gravity of the molten metal, and segregation of MC carbides can be prevented.

2.1×C mass %+1.2×Si mass %−Cr mass %+0.5×Mo mass %+(V mass %+Nb mass %/2)≤13.0 mass %       Condition (b)

Conventionally, in order to crystallize a large amount of MC carbides to increase wear resistance and stably crystallize graphite simultaneously, a large amount of C and Si are added to a high alloy grain cast iron material with an increased carbide forming element concentration. However, it was found that, even if the concentration of V or Nb, which form MC carbides, is increased, as a result of reducing the amount of C, excessive crystallization of MC carbides can be suppressed. This condition is a condition for controlling the amount of crystallization of MC carbides and suppressing segregation. In order to avoid segregation of MC carbides, it is necessary to make the specific gravity of MC carbides be close to the specific gravity of a molten metal, taking into consideration MC carbides containing, as the main component, V whose specific gravity is smaller than that of the molten metal and MC carbides containing, as the main component, Nb whose specific gravity is larger than that of the molten metal. The atomic weight of V is 50.94, the atomic weight of Nb is 92.91, which is approximately double the atomic weight of V, and in order to obtain the same effect regarding an MC carbide forming effect, the amount of Nb required is double that of V. Thus, with regard to V and Nb that are adjusted in the above-described condition (a), the amounts of C, Si, Cr, and Mo are respectively defined in this condition (b) with respect to a V equivalent (V mass %+Nb mass %/2) serving as the standard (a coefficient is 1.0). The amount of C, serving as an element that crystallizes graphite and forms MC carbides, is set to 2.1 times the V equivalent. Also, because Si is required as an element that facilitates crystallization of graphite, in order to ensure the amount of crystallization of graphite, the amount of Si is set to 1.2 times the V equivalent. Although the coefficient of Cr with respect to the V equivalent is set to 1.0 because the atomic weight of Cr (having an atomic weight of 52.0) is close to the atomic weight of V, even if C is consumed to form carbides, Cr has an effect of suppressing segregation in formation, and thus a "-" coefficient was set as the opposite effect to that of the other carbide forming elements. The atomic weight of Mo (having an atomic weight of 95.94) is approximately double the atomic weight of V and Mo is less likely to form MC carbides than V, and thus the coefficient of Mo is set to 0.5 with respect to the V equivalent. It was found that, as a result of setting the upper limit of the sum of the left side of the condition (b) expression to 13.0 mass % on the basis of various pieces of experimental data based on functional effects and effects of MC carbides on segregation, segregation of MC carbides cap be suppressed. The preferred upper limit of the condition (b) is 12.5 mass %.

Satisfying the above-described conditions (a) and (b) makes it possible to suppress segregation of MC carbides with high hardness in the outer layer, and to approximately evenly disperse MC carbides from the outer side to the inner side of the outer layer, and thus wear resistance, surface roughening resistance, and accident resistance can be improved.

The above-described outer layer may further contain W. W has a functional effect that is similar to that of Mo, but tends to cause lamination segregation if a centrifugal casting method is used, and thus the content of W is preferably set to more than 0 mass % and 3.0 mass % or less. Preferably, the content of W is 2.0 mass % or less.

Also, if the outer layer contains W, the following condition (b') is used as the above-described condition (b).

$2.1 \times C$ mass %$+1.2 \times Si$ mass %$-Cr$ mass %$+0.5 \times (Mo$ mass %$+W$ mass %$/2)+(V$ mass %$+Nb$ mass %$/2) \leq 13.0$ mass %   Condition (b')

The atomic weight of Mo is 95.94 and the atomic weight of W is 183.8, which is approximately double the atomic weight of Mo, and thus the amount of W required is double that of Mo in terms of an Mo equivalent. Thus, the amount of W is set to the Mo equivalent (Mo mass %$+W$ mass %$/2$) in this condition (b'), with respect to the above-described condition (b). Note that the preferred upper limit thereof is also 12.5 mass % in the condition (b').

Note that it is preferable that the outer layer has an MC carbide area ratio of 4.0% to 11.0%. If the MC carbide area ratio is less than 4.0%, the outer layer may have an insufficient wear resistance improvement effect in some cases. Also, this is because it is difficult to make the MC carbide area ratio more than 11.0% due to a coexistence relationship with graphite.

Also, it is preferable to adjust a graphite area ratio of the outer layer to 0.5% to 5.0%. If the graphite area ratio is less than 0.5%, the outer layer has an insufficient seizure resistance improvement effect, and a crack will appear due to the outer layer being subjected to thermal shock in a chew up accident and seizing occurs. Seizing concentrates a load, and thus significantly accelerates growth of a crack. Crystallization of graphite in the outer layer makes it possible to suppress growth of a crack that has appeared due to the outer layer being subjected to thermal shock in a chew up accident, and to increase the crack resistance of the outer layer. For example, the amount of crystallized graphite can be adjusted by adding an inoculant such as a Fe—Si or Ca—Si inoculant to a molten metal of the outer layer. On the other hand, if the graphite area ratio exceeds 5.0%, there is a risk that the wear resistance and mechanical properties of the outer layer will significantly decrease.

Also, the above-described outer layer may further contain B. In this case, if the outer layer contains B in an amount of more than 0.1 mass %, the mechanical properties of the outer layer decrease significantly, and thus the upper limit of the content of B is set to 0.1 mass %. The content of B is preferably set to 0.05 mass % or less.

WORKING EXAMPLES

A molten alloy containing various components shown in Table 1 was produced and centrifugal casting was performed in a high-frequency induction furnace to produce an outer layer material. In Table 1, Inv., Ex. includes Inventive Examples 1 to 13, Comp. Ex. includes Comparative Examples 1 to 9, and the composition of molten metal components for each example is listed. The conditions (a) and (b) (note, the condition (b') if an outer layer material contained W) were also calculated.

Note that, in Table 1, with regard to each outer layer material, a component that was not added or a component that was not detected although it was possibly added was given "-". Also, in Table 1 and Table 2 showing the results of measurements and tests, a component and a condition that did not satisfy the scope of the present invention, a value that is not a preferred measurement value or test result of the present invention, or a value that is greatly inferior to that of an inventive example is given an "asterisk (*)" in order to facilitate visual understanding thereof.

TABLE 1

| Test Material | C | Si | Mn | Ni | Cr | Mo | W | V | Nb | B | Condition (a) | Condition (b) |
|---|---|---|---|---|---|---|---|---|---|---|---|---|
| Inv. Ex. 1 | 2.33 | 2.19 | 0.68 | 4.83 | 0.84 | 1.98 | — | 3.89 | 0.20 | — | 0.05 | 11.0 |
| Inv. Ex. 2 | 3.00 | 2.08 | 0.70 | 4.50 | 1.09 | 3.00 | — | 3.04 | 0.21 | — | 0.07 | 12.4 |
| Inv. Ex. 3 | 2.44 | 2.56 | 0.67 | 6.85 | 1.15 | 1.98 | — | 3.90 | 0.19 | — | 0.05 | 12.0 |
| Inv. Ex. 4 | 2.53 | 2.26 | 0.66 | 4.47 | 0.96 | 1.88 | — | 3.99 | 0.20 | — | 0.05 | 12.1 |
| Inv. Ex. 5 | 2.51 | 2.61 | 0.77 | 4.57 | 1.09 | 2.00 | — | 3.98 | 0.20 | — | 0.05 | 12.4 |
| Inv. Ex. 6 | 2.79 | 1.80 | 0.81 | 4.56 | 0.79 | 1.55 | — | 4.62 | 0.16 | — | 0.03 | 12.7 |
| Inv. Ex. 7 | 2.30 | 2.75 | 0.45 | 4.32 | 1.00 | 2.15 | — | 3.45 | 0.27 | — | 0.08 | 11.8 |
| Inv. Ex. 8 | 2.58 | 1.98 | 0.66 | 5.11 | 1.33 | 2.16 | — | 3.68 | 0.12 | — | 0.03 | 11.3 |
| Inv. Ex. 9 | 2.46 | 2.15 | 0.74 | 4.52 | 0.97 | 1.99 | — | 3.90 | 0.20 | 0.030 | 0.05 | 11.8 |
| Inv. Ex. 10 | 2.90 | 1.50 | 0.66 | 5.12 | 0.99 | 2.09 | — | 2.92 | 0.20 | 0.049 | 0.07 | 11.0 |
| Inv. Ex. 11 | 2.64 | 2.19 | 0.70 | 4.52 | 1.46 | 1.98 | — | 3.32 | 0.20 | 0.025 | 0.06 | 11.1 |
| Inv. Ex. 12 | 3.01 | 2.65 | 0.73 | 4.50 | 1.98 | 2.08 | — | 3.20 | 0.10 | — | 0.03 | 11.8 |
| Inv. Ex. 13 | 2.79 | 1.51 | 0.67 | 4.01 | 0.95 | 1.48 | 1.03 | 3.35 | 0.10 | 0.009 | 0.03 | 11.1 |
| Comp. Ex. 1 | *3.74 | 1.69 | 0.71 | 4.53 | 1.01 | 2.57 | — | 3.00 | 0.20 | — | 0.07 | *13.3 |
| Comp. Ex. 2 | 2.53 | 2.59 | 0.72 | 4.53 | 0.98 | 2.02 | — | 4.53 | 0.20 | — | 0.04 | *13.1 |
| Comp. Ex. 3 | 2.60 | 2.59 | 0.73 | 4.38 | 1.02 | 1.98 | — | *5.6 | 0.21 | — | 0.04 | *14.2 |
| Comp. Ex. 4 | *3.42 | 1.88 | 0.67 | 4.36 | 0.84 | 2.95 | 0.99 | *2.56 | *0.54 | 0.040 | *0.21 | *13.2 |
| Comp. Ex. 5 | 2.71 | 1.96 | 0.81 | 4.42 | 0.95 | 2.09 | — | 4.71 | 0.48 | — | 0.10 | *13.1 |
| Comp. Ex. 6 | *2.13 | *0.71 | 0.73 | *0.04 | *6.58 | 2.35 | *3.58 | 4.56 | 0.35 | 0.030 | 0.08 | 5.6 |
| Comp. Ex. 7 | *3.42 | *0.85 | 0.69 | 4.43 | 1.80 | *0.37 | — | *0.3 | 0.48 | 0.030 | *1.6 | 7.1 |
| Comp. Ex. 8 | 3.01 | 2.54 | 0.73 | 3.59 | *2.51 | 1.58 | — | 3.72 | 0.31 | — | 0.08 | 11.5 |
| Comp. Ex. 9 | *3.36 | *0.85 | 0.69 | 3.12 | 1.75 | *0.28 | — | *0.51 | 0.20 | 0.030 | *0.39 | 7.1 |

With the inventive examples and comparative examples of outer layer materials, the GNo. of a mold rotational speed during centrifugal casting was set to 100 G to 200 G, and the casting temperature was set to 1250° C. to 1360° C. Outer layer materials had an outer diameter of 300 mm and a length of 200 mm, and had an outer diameter of 570 mm to 800 mm and a length of 1100 mm to 2500 mm. Also, after tempering of each outer layer material was repeated at 400° C. to 600° C. several times, a test material having a size of 200 mm×200 mm was collected from each outer layer material. Note that y heat treatment at 850° C. or more, quenching, and tempering may be performed.

As will be described below, with regard to the obtained test materials, whether or not MC carbides underwent segregation, a graphite area ratio, an MC carbide area ratio, a seizure load, and the amount of wear were measured. Note that, with regard to Comparative Examples 1 to 5 in which segregation of MC carbides, which will be described below, was observed, the graphite area ratio and the like of only Comparative Examples 3 and 4 were measured.

Figure 2:
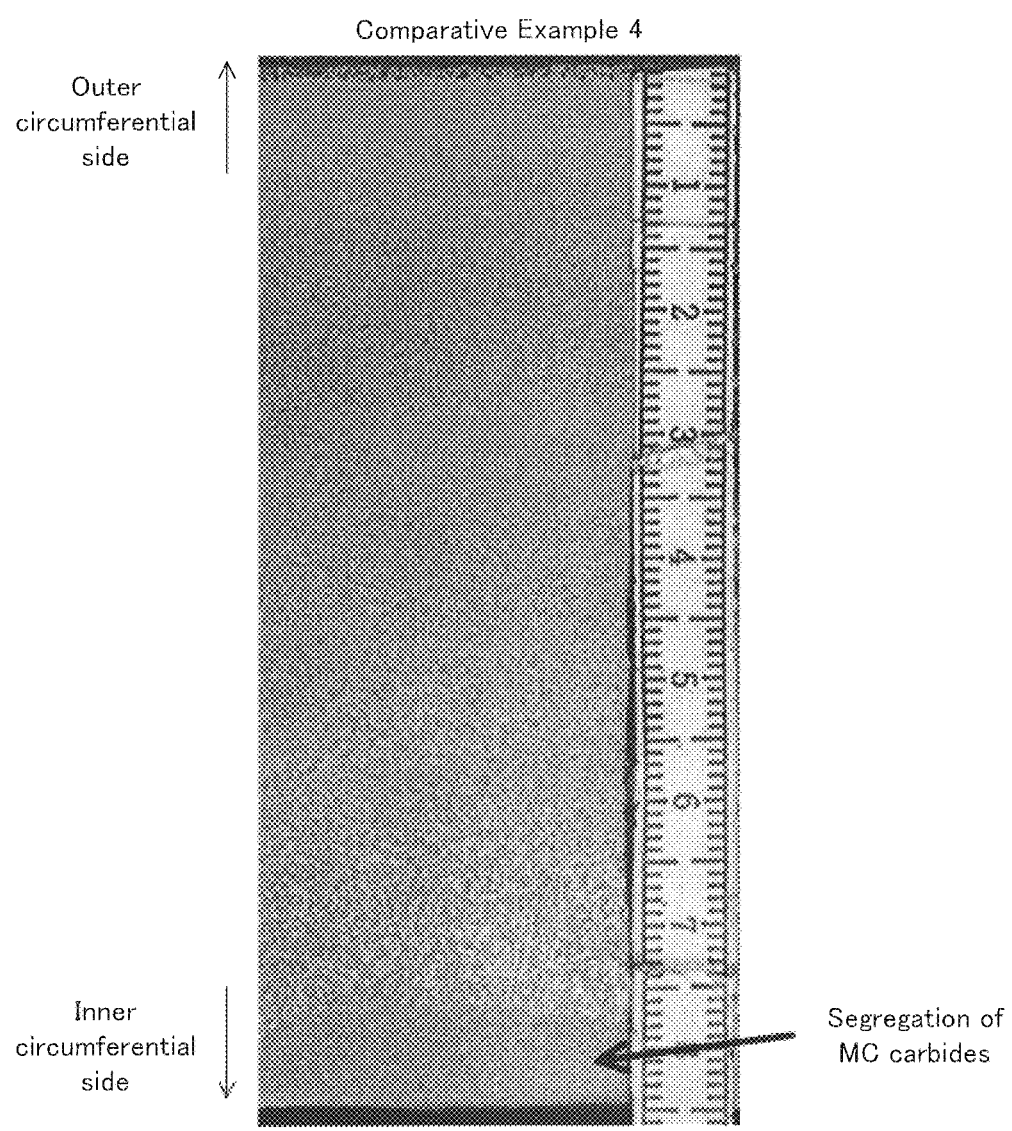
FIG. 2 is a photograph of a macrostructure of a cross section of a test material of Comparative Example 4 in the longitudinal direction.
Figure 3:
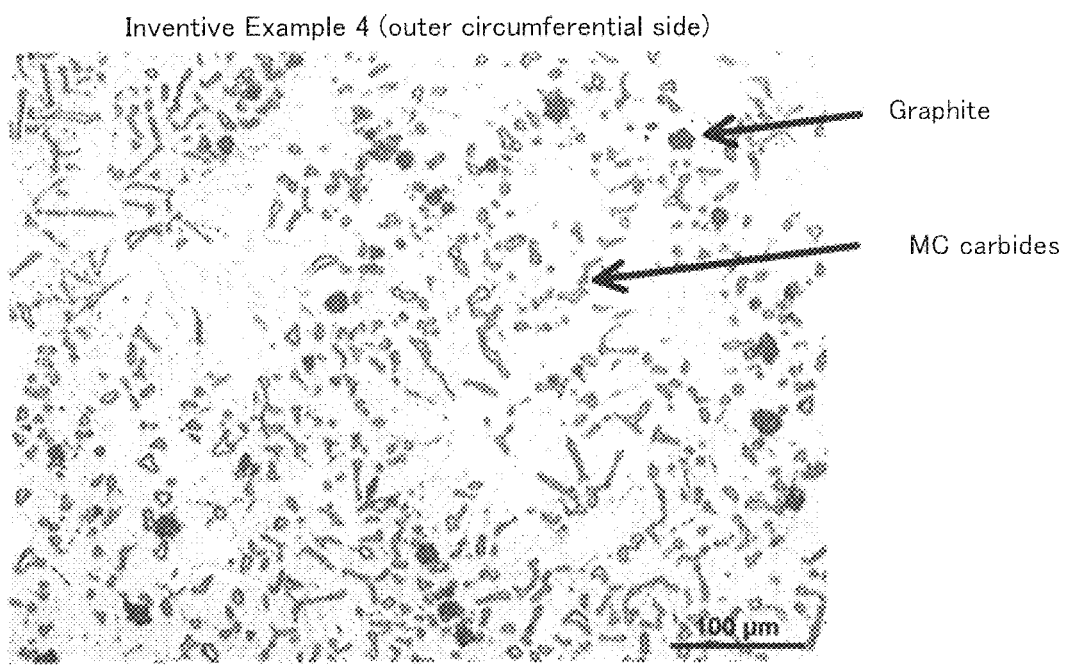
FIG. 3 is a photograph of a microstructure of a test material of Inventive Example 4 at a position 20 mm from the outer side of the test material.
Figure 4:
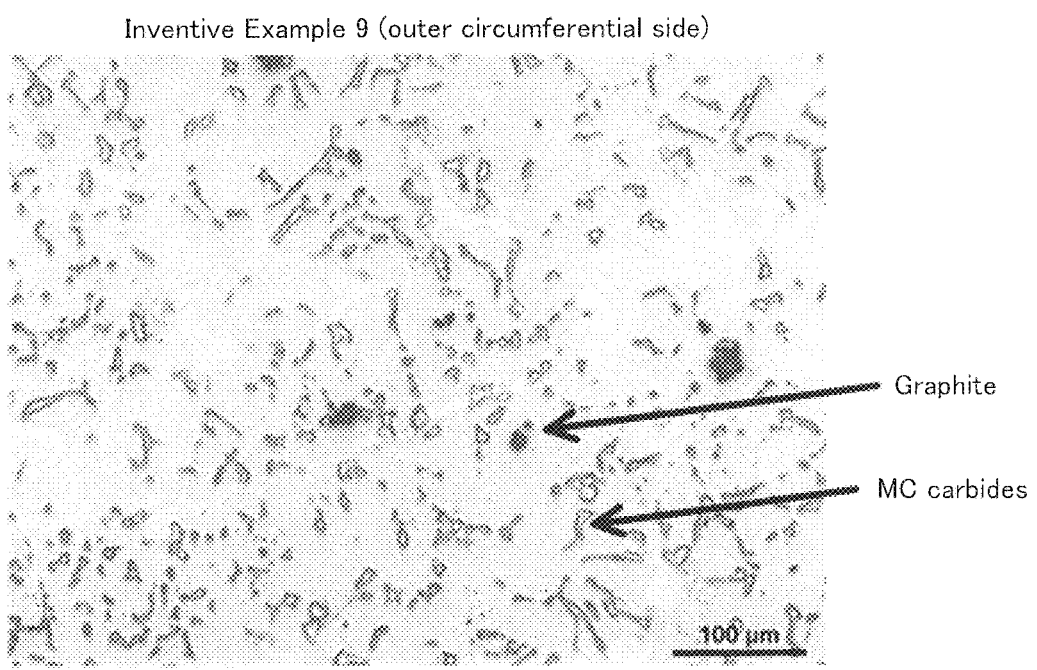
FIG. 4 is a photograph of a microstructure of the test material of Inventive Example 9 at a position 20 mm from the outer side of the test material.
Figure 5:
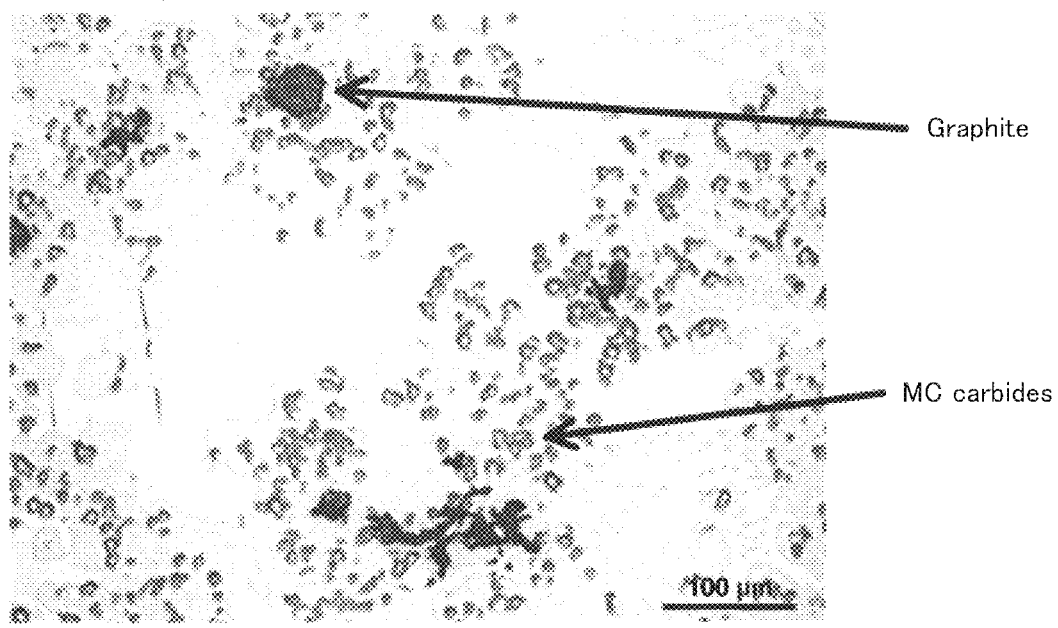
FIG. 5 is a photograph of a microstructure of the test material of Comparative Example 4 at a position 20 mm from the outer side of the test material.
Figure 6:
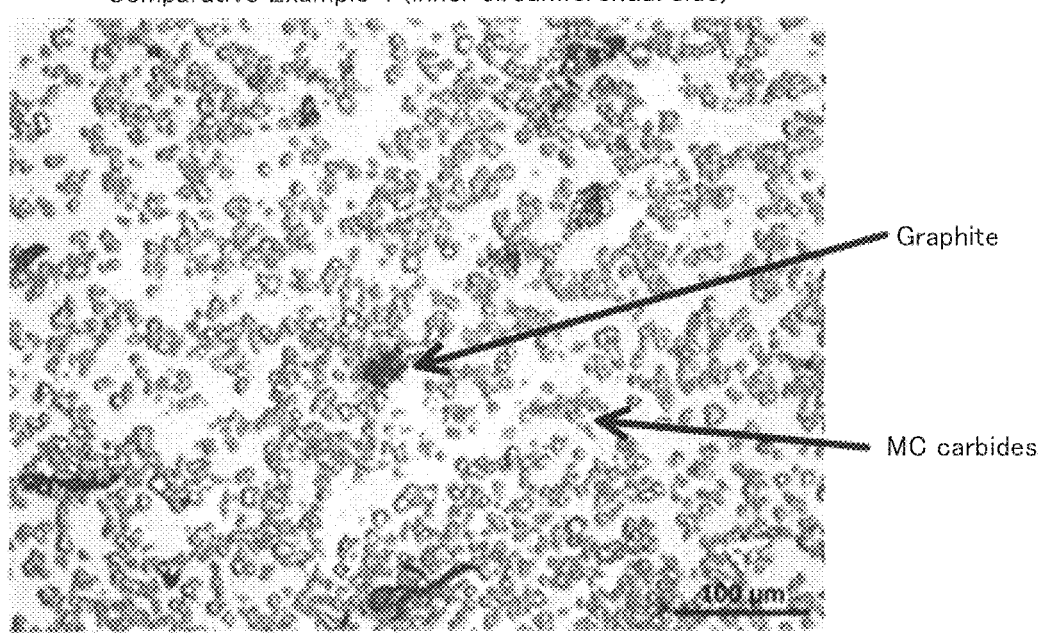
FIG. 6 is a photograph of a microstructure of the test material of Comparative Example 4 near the inner side of the test material.

First, in order to measure segregation of MC carbides, the graphite area ratio, and the MC carbide area ratio, each test material was polished using a sandpaper with a particle size of 240, etching was performed on the polished test material using an aqueous solution of nitric acid over the full length of the test material on a cross section in the longitudinal direction, and a photograph of a macrostructure was taken. Also, after a photograph of a macrostructure was taken, alumina buffing was performed on the test material, and a photograph of a microstructure was taken. For reference, photographs of macrostructure of Inventive Example 9 and Comparative Example 4 are shown in FIGS. 1 and 2, photographs of microstructures of Inventive Examples 4 and 9 and Comparative Example 4 at a position 20 mm from the outer side of the cross section in the longitudinal direction are shown in FIGS. 3 to 5, and a photograph of a microstructure of Comparative Example 4 near the inner side of the cross section in the longitudinal direction is shown in FIG. 6. MC carbides protrude when alumina buffing is performed more than other carbides due to MC carbides being hard, and thus shadows of protruding MC carbides appear in photographs of this structure. Also, a black mass indicates graphite in photographs of microstructures.

Segregation of MC Carbides

Segregation of MC carbides was evaluated based on the obtained photographs of macrostructures. Referring to FIGS. 1 and 2, in FIG. 1 (Inventive Example 9), segregation of MC carbides in the cross section of the test material taken in the longitudinal direction was not observed. On the other hand, in FIG. 2 (Comparative Example 4), a heavily corroded region was observed on the inner side of the test material, that is, on the lower side of FIG. 2. This region indicates that MC carbides underwent segregation. Referring to photographs of microstructures (FIGS. 5 and 6) of Comparative Example 4 in the cross section taken in the longitudinal direction on the outer side and the inner side, from the fact that MC carbides were sparse on the outer side in FIG. 5, whereas MC carbides were dense on the inner side in FIG. 6, it is understood that MC carbides segregated to the inner side in Comparative Example 4. This is because MC carbides that were lighter in weight with respect to the specific gravity of a molten metal were excessively crystallized, and MC carbides aggregated on the inner side during centrifugal casting due to the difference between specific gravities. As with Comparative Example 4, if MC carbides segregated to the inner side of an outer layer material, a segregation layer is unlikely to re-melt even if a core material such as an interlayer or an inner core is cast on the inner side of the outer layer, and thus MC carbides remain at a boundary, cause a bonding error, and reduce accident resistance, and thus such a material is not suitable as an outer layer of a composite roll for rolling. Note that, with regard to the test material of Inventive Example 9 shown in FIG. 1, a structure that is different from that on the inner side was observed in a range of approximately 20 mm on the inner side, but this layer was not problematic because it was a final solidified layer with a relatively low melting point, was re-melt when a core material was cast, and bonding soundness was favorable, although this layer had some shrinkage cavities.

In a similar manner, whether or not segregation of MC carbides occurred was checked from photographs of microstructures of each test material. Then, a case where no segregation of MC carbides occurred was evaluated as "1 (no)", and a case where segregation of MC carbides occurred was evaluated as "2 (yes)" based on the obtained photographs of each structure. The results are shown in "Segregation of MC carbides" in Table 2.

TABLE 2

| Test Material | Segregation of MC carbides | Graphite area ratio (%) | MC carbide area ratio (%) | Seizure load (N) | Amount of wear (μm) |
| --- | --- | --- | --- | --- | --- |
| Inv. Ex. 1 | 1 (no) | 0.50 | 7.50 | 702 | 30 |
| Inv. Ex. 2 | 1 (no) | 2.80 | 5.30 | 1023 | 45 |
| Inv. Ex. 3 | 1 (no) | 1.48 | 7.08 | 835 | 34 |
| Inv. Ex. 4 | 1 (no) | 1.60 | 6.30 | 860 | 28 |
| Inv. Ex. 5 | 1 (no) | 1.91 | 6.41 | 858 | 39 |
| Inv. Ex. 6 | 1 (no) | 0.80 | 8.03 | 718 | 25 |
| Inv. Ex. 7 | 1 (no) | 0.9 | 7.10 | 718 | 42 |
| Inv. Ex. 8 | 1 (no) | 1.30 | 5.80 | 817 | 39 |
| Inv. Ex. 9 | 1 (no) | 0.60 | 7.35 | 705 | 31 |
| Inv. Ex. 10 | 1 (no) | 0.85 | 4.60 | 744 | 41 |
| Inv. Ex. 11 | 1 (no) | 0.90 | 7.10 | 735 | 43 |
| Inv. Ex. 12 | 1 (no) | 2.1 | 6.5 | 886 | 42 |
| Inv. Ex. 13 | 1 (no) | 1.11 | 4.85 | 765 | — |
| Comp. Ex. 1 | 2 (yes) | — | — | — | — |
| Comp. Ex. 2 | 2 (yes) | — | — | — | — |
| Comp. Ex. 3 | 2 (yes) | *0.2 | 8.8 | 486 | 28 |
| Comp. Ex. 4 | 2 (yes) | 1.21 | *3.95 | *702 | *49 |
| Comp. Ex. 5 | 2 (yes) | — | — | — | — |
| Comp. Ex. 6 | 1 (no) | *0 | 7.2 | 440 | 26 |
| Comp. Ex. 7 | 1 (no) | 2.02 | *1.57 | *896 | *94 |
| Comp. Ex. 8 | 1 (no) | *0 | *3.84 | 472 | *53 |
| Comp. Ex. 9 | 1 (no) | 2.36 | *0.86 | *946 | *103 |

Referring to Table 2, it is understood that all of the inventive examples were evaluated as "1 (no)", and segregation of MC carbides was not observed. This is because all of the inventive examples satisfied the conditions (a) and (b) or (b'). In particular, Nb was dissolved in MC carbides containing V as the main component to form a solid solution due to a mass ratio between the content of V and the content of Nb, which is the condition (a), being satisfied, and thus crystallization of MC carbides containing, as the main component, Nb whose specific gravity is larger than that of a molten metal is suppressed, and the specific gravity of MC carbides was adjusted to be close to the specific gravity of the molten metal. Furthermore, as a result of setting the alloy composition to satisfy the condition (b) expression, segregation of MC carbides was significantly suppressed. Accordingly, it is understood that wear resistance, surface roughening resistance, and accident resistance of a composite roll for rolling having the outer layer of an inventive example were improved by reducing segregation of MC carbides.

On the other hand, with regard to the comparative examples, Comparative Examples 1 to 5 were evaluated as "2 (yes)". The reason why Comparative Examples 1, 2, and 5 were evaluated as "2 (yes)" is that, even though the concentrations of V and Nb that form MC carbides were appropriate, with these comparative examples, the amounts thereof with respect to the concentration of C and the concentration Cr did not satisfy the condition (b) as a whole, and excessively crystallized MC carbides underwent segregation. In particular, it is understood that, with Comparative Examples 2 and 5, a component range of each element was included in the scope of the present invention, but did not satisfy the condition (b), resulting in segregation of MC carbides, With regard to Comparative Example 3, the reason is that Comparative Example 3 contained a large amount of V, MC carbides that are lighter in weight with respect to the specific gravity of the molten metal were crystallized, and thus segregation occurred. Also, the reason is that Comparative Example 4 contained a small amount of V, whereas it contained a large amount of Nb, and not only the condition (b) but also the condition (a) were not satisfied, as a result of which MC carbides that were heavy with respect to the specific gravity of the molten metal were crystallized and segregation occurred.

Graphite Area Ratio (%)

Next, photographs of microstructures of the obtained test materials on the outer side of cross sections in the longitudinal direction were taken in a manner that was similar to the above-described manner, and the amount of graphite was measured as the graphite area ratio. Note that Comparative Examples 1, 2, and 5 in which segregation of MC carbides was confirmed were excluded from the following measurements and tests.

With regard to the test materials of Inventive Examples 4 and 9 and Comparative Example 4, photographs of microstructures on the inner side of outer layer materials are shown in FIGS. 3 to 5. The results are shown in "Graphite area ratio" in Table 2. Referring to Table 2, with all of the inventive examples, the graphite area ratios were adjusted to 0.5% to 5.0%. With Comparative Examples 4, 7, and 9, the graphite area ratios were also adjusted to 0.5% to 5.0%. As a result of adjusting the graphite area ratios to the above-described range, growth of a crack that has appeared in an outer layer material due to thermal shock can be prevented by graphite, and the crack resistance of the outer layer material can be increased.

With both Comparative Examples 6 and 8, crystallization of graphite was not observed. This is because Comparative Examples 6 and 8 had a high Cr %.

MC Carbide Area Ratio (%)

The amount of MC carbides was measured according to an MC carbide area ratio from photographs of microstructures on the inner side of test materials (e.g., see FIGS. 3 to 5), The results are shown in "MC carbide area ratio" in Table 2, Referring to Table 2, it is understood that, with all of the inventive examples, the amount of MC carbides were adjusted to a range of 4.0% to 11.0%, and these inventive examples had good wear resistance. On the other hand, it is understood that Comparative Examples 4, 7 to 9 were inferior thereto in terms of wear resistance because their MC carbide area ratios were less than 4.0%.

Seizure Load (N)

A seizure load was measured using a high-speed Falex-type wear tester (product name: high speed Falex-type friction tester, manufactured by Shinko Engineering Co., Ltd.). In a test, a cylindrical test piece (having a diameter of 10 mm and a length of 35 mm) was collected from each test material, the test piece was held by two V-blocks made of SUS430 while the test piece was rotated at 200 rpm, a load was raised at a speed of 15 N/9 sec until the load reached 1500 N while a load was applied at a rising speed of 100 N/sec. The inflection point of torque during the test was evaluated as a seizure load. The higher the seizure load is, the better the seizure resistance is. The results are shown in "Seizure load" in Table 2. Referring to Table 2, it is understood that all of the inventive examples had a high seizure load, and were provided with sufficient seizure resistance compared to the comparative examples. On the other hand, it is understood that Comparative Examples 4, 7, and 9 did not have a sufficient seizure load, and had poor seizure resistance.

Amount of Wear (μm)

The amount of wear was measured using the above-described high-speed. Falex-type wear tester. A test was performed by collecting a cylindrical test piece (having a diameter of 10 mm and a length of 35 mm) from each test material, holding the test piece using two V-blocks made of SS400 while rotating the test piece at 200 rpm, applying a load at a rising speed of 100 N/sec, and holding the load applied at a time when the load reached 1000 N for 30 minutes. After the test was performed, the amount of wear of a contact surface between the test piece and a V-block was measured. The results are shown in "Amount of wear" in Table 2. Referring to Table 2, it is understood that the amount of wear for all of the inventive examples was small, and all of the inventive examples were provided with sufficient wear resistance. On the other hand, it is understood that the amount of wear for Comparative Examples 4, 7 to 9 was large, and these comparative examples had poor wear resistance. This is because the amount of MC carbides required to improve wear resistance is less than 4.0% in terms of area ratio.

Comprehensive Evaluation

Referring to the above-described measurements and test results, it is understood that, with all of the inventive examples, segregation of MC carbides was not observed, and thus a bonding error with a core material was avoided, and accident resistance of the inventive examples used as a composite roll for rolling was improved. Also, it is understood that the graphite area ratio and MC carbide area ratio were respectively adjusted in desired ranges, and thus the inventive examples were excellent as an outer layer of a composite roll for rolling in terms of seizure load and the amount of wear.

As described above, an outer layer of a composite roll for rolling of the present invention has excellent wear resistance, crack resistance, and accident resistance, and thus the lifespan of the roll can be extended, accordingly, the cost of the roll can be reduced, and the composite roll for rolling of the present invention contributes to stabilization of roll stock management. In particular, the composite roll for rolling of the present invention is suitable for applications to a finishing later stand that is required to be particularly stable in operation.

The above description is for describing the present invention, and should not be interpreted as limiting or restricting the scope of claims of the present invention. Furthermore, it goes without saying that the configurations of the constituent elements of the present invention are not limited to the above-described embodiments, and that various modifications are possible within the technical scope of the claims.

The invention claimed is:

1. A composite roll for rolling that has an outer layer and is produced through centrifugal casting, wherein the outer layer contains C in an amount of 2.2 mass % to 3.01 mass %, Si in an amount of 1.0 mass % to 3.0 mass %, Mn in an amount of 0.3 mass % to 2.0 mass %, Ni in an amount of 3.0 mass % to 7.0 mass %, Cr in an amount of 0.5 mass % to 2.5 mass %, Mo in an amount of 1.0 mass % to 3.0 mass %, V in an amount of 2.5 mass % to 5.0 mass %, Nb in an amount of more than 0 mass % and 0.5 mass % or less, and a remaining portion including Fe and inevitable impurities, and Nb mass %/V mass %<0.1, and    a condition (a):

$2.1 \times C$ mass $\% + 1.2 \times Si$ mass $\% - Cr$ mass $\% + 0.5 \times Mo$ mass $\% + (V$ mass $\% + Nb$ mass $\%/2) \leq 13.0$ mass % are satisfied.    a condition (b):

2. The composite roll for rolling according to claim 1, wherein Mo of the outer layer is in an amount of more than 1.55 mass % and 3.0 mass % or less.

3. The composite roll for rolling according to claim 2, wherein the outer layer further contains B in an amount of more than 0 mass % and 0.1 mass % or less.

4. The composite roll for rolling according to claim 3, wherein the outer layer has a graphite area ratio of 0.5% to 5.0%.

5. The composite roll for rolling according to claim 3, wherein the outer layer has an MC carbide area ratio of 4.0% to 11.0%.

6. The composite roll for rolling according to claim 2, wherein the outer layer has a graphite area ratio of 0.5% to 5.0%.

7. The composite roll for rolling according to claim 2, wherein the outer layer has an MC carbide area ratio of 4.0% to 11.0%.

8. The composite roll for rolling according to claim 1, wherein the outer layer further contains B in an amount of more than 0 mass % and 0.1 mass % or less.

9. The composite roll for rolling according to claim 8, wherein the outer layer has a graphite area ratio of 0.5% to 5.0%.

10. The composite roll for rolling according to claim 8, wherein the outer layer has an MC carbide area ratio of 4.0% to 11.0%.

11. The composite roll for rolling according to claim 1, wherein the outer layer has a graphite area ratio of 0.5% to 5.0%.

12. The composite roll for rolling according to claim 1, wherein the outer layer has an MC carbide area ratio of 4.0% to 11.0%.

13. A composite roll for rolling that has an outer layer and is produced through centrifugal casting, wherein the outer layer contains C in an amount of 2.2 mass % to 3.01 mass %, Si in an amount of 1.0 mass % to 3.0 mass %, Mn in an amount of 0.3 mass % to 2.0 mass %, Ni in an amount of 3.0 mass % to 7.0 mass %, Cr in an amount of 0.5 mass % to 2.5 mass %, Mo in an amount of 1.0 mass % to 3.0 mass %, W in an amount of more than 0 mass % and 3.0 mass % or less, V in an amount of 2.5 mass % to 5.0 mass %, Nb in an amount of more than 0 mass % and 0.5 mass % or less, and a remaining portion including Fe and inevitable impurities, and Nb mass %/V mass %<0.1, and    a condition (a):

$2.1 \times C$ mass $\% + 1.2 \times Si$ mass $\% - Cr$ mass $\% + 0.5 \times (Mo$ mass $\% + W$ mass $\%/2) + (V$ mass $\% + Nb$ mass $\%/2) \leq 13.0$ mass % are satisfied.    a condition (b'):

14. The composite roll for rolling according to claim 13, wherein the outer layer further contains B in an amount of more than 0 mass % and 0.1 mass % or less.

15. The composite roll for rolling according to claim 14, wherein the outer layer has a graphite area ratio of 0.5% to 5.0%.

16. The composite roll for rolling according to claim 14 wherein the outer layer has an MC carbide area ratio of 4.0% to 11.0%.

17. The composite roll for rolling according to claim 13, wherein the outer layer has a graphite area ratio of 0.5% to 5.0%.

18. The composite roll for rolling according to claim 13, wherein the outer layer has an MC carbide area ratio of 4.0% to 11.0%.

\* \* \* \* \*